US009416251B2

(12) United States Patent
Hintzer et al.

(10) Patent No.: US 9,416,251 B2
(45) Date of Patent: Aug. 16, 2016

(54) ARTICLE PREPARED FROM CLEAN FLUOROPOLYMERS

(71) Applicant: 3M INNOVATIVE PROPERTIES COMPANY, St. Paul, MN (US)

(72) Inventors: Klaus Hintzer, Kastl (DE); Kai H. Lochhaas, Neuötting (DE); Michael Jürgens, Moenchengladbach (DE); Harald Kaspar, Burgkirchen (DE); Tilman C. Zipplies, Burghausen (DE); André Streiter, Muehldorf am Inn (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 59 days.

(21) Appl. No.: 14/032,912

(22) Filed: Sep. 20, 2013

(65) Prior Publication Data
US 2014/0094564 A1    Apr. 3, 2014

Related U.S. Application Data

(62) Division of application No. 12/682,702, filed as application No. PCT/US2008/079529 on Oct. 10, 2008, now Pat. No. 8,541,499.

(60) Provisional application No. 60/979,688, filed on Oct. 12, 2007.

(51) Int. Cl.
| C08F 2/24 | (2006.01) |
| C08K 5/19 | (2006.01) |
| C08L 27/18 | (2006.01) |
| C08F 14/18 | (2006.01) |
| C08F 214/18 | (2006.01) |
| C08K 5/095 | (2006.01) |

(52) U.S. Cl.
CPC ... *C08K 5/19* (2013.01); *C08F 2/24* (2013.01); *C08F 14/18* (2013.01); *C08F 214/18* (2013.01); *C08K 5/095* (2013.01)

(58) Field of Classification Search
USPC .......................................... 524/546; 526/247
See application file for complete search history.

(56) References Cited

U.S. PATENT DOCUMENTS

| 3,129,207 A | 4/1964 | Virgil |
| 3,870,689 A | 3/1975 | Modena et al. |
| 5,182,342 A | 1/1993 | Feiring et al. |
| 5,268,405 A | 12/1993 | Ojakaar |
| 5,281,680 A | 1/1994 | Grot |
| 5,763,552 A | 6/1998 | Feiring |
| 5,852,125 A | 12/1998 | Krüger |
| 5,856,587 A | 1/1999 | Visca et al. |
| 6,103,843 A | 8/2000 | Abusleme et al. |
| 6,114,452 A | 9/2000 | Schmiegel |
| 6,258,907 B1 | 7/2001 | Funaki et al. |
| 6,429,258 B1 | 8/2002 | Morgan |
| 6,890,995 B2 | 5/2005 | Kolb |
| 6,933,357 B2 | 8/2005 | Grootaert |
| 6,956,085 B2 | 10/2005 | Grootaert |
| 7,138,470 B2 | 11/2006 | Fukushi |
| 7,531,700 B2 | 5/2009 | Petrov |
| 7,589,234 B2 * | 9/2009 | Morita ................... C08F 14/18 562/586 |
| 7,776,946 B2 | 8/2010 | Hintzer et al. |
| 8,198,480 B2 | 6/2012 | Morita et al. |
| 2003/0023021 A1 | 1/2003 | Sakuma |
| 2004/0024134 A1 | 2/2004 | Grootaert |
| 2005/0143523 A1 | 6/2005 | Van Gool |
| 2006/0199898 A1 | 9/2006 | Funaki |
| 2006/0223924 A1 | 10/2006 | Tsuda |
| 2006/0281946 A1 * | 12/2006 | Morita ................... C08F 14/18 562/586 |
| 2007/0015864 A1 | 1/2007 | Hintzer |
| 2007/0015865 A1 | 1/2007 | Hintzer |
| 2007/0025902 A1 | 2/2007 | Hintzer |
| 2007/0051916 A1 | 3/2007 | Flynn et al. |
| 2007/0060699 A1 | 3/2007 | Tsuda |
| 2007/0100062 A1 | 5/2007 | Lyons |
| 2007/0117915 A1 * | 5/2007 | Funaki et al. ................. 524/544 |
| 2007/0142513 A1 | 6/2007 | Tsuda |
| 2007/0142541 A1 | 6/2007 | Hintzer |
| 2008/0306196 A1 | 12/2008 | Irie |

FOREIGN PATENT DOCUMENTS

| EP | 0 625 526 A1 | 11/1994 |
| EP | 1 698 662 A1 | 9/2006 |
| EP | 1698662 A1 * | 9/2006 |
| EP | 1 783 167 A1 | 5/2007 |
| EP | 1783167 A1 * | 5/2007 |
| EP | 1 942 118 | 7/2008 |
| WO | WO 02/060968 A1 | 8/2002 |

(Continued)

OTHER PUBLICATIONS

Oka, "Vinylidene Fluoride—Hexafluoropropylene Copolymer Having Terminal Iodines", Contemporary Topics in Polymer Science, 1984, vol. 4, pp. 763-777.
John Scheirs, "Modern Fluoropolymers, High Performance Polymers for Diverse Applications", (1997).
Marchionni et al., "Hydrofluoropolyethers", Journal of Fluorine Chemistry, vol. 95, 1999, pp. 41-50.
Extended European Search Report for Application No. 08837794, PCT/US2008/079529, 6 pgs.
International Search Report for PCT/US2008/079529, 4 pgs.
Written Opinion of the ISA for International Application No. PCT/US2008/079529, 6 pgs.

*Primary Examiner* — Peter D Mulcahy
*Assistant Examiner* — Henry Hu
(74) *Attorney, Agent, or Firm* — C. Michael Geise

(57) ABSTRACT

There is provided an article prepared from a fluoroelastomer, the fluoroelastomer being derived from an emulsion, the emulsion comprising a fluorinated emulsifier represented by the formula $F-(CF_2)_t-[O(CF_2)_n]_m-O-(CHF)_o-(CF_2)_p-X$.

1 Claim, No Drawings

(56) References Cited

FOREIGN PATENT DOCUMENTS

| WO | WO-02/060968 A1 * | 8/2002 |
| WO | WO-2005/003075 A1 * | 1/2005 |
| WO | WO 2006/011547 A1 | 2/2006 |
| WO | WO 2006/127226 A1 | 11/2006 |
| WO | WO-2006/127226 A1 * | 11/2006 |
| WO | WO 2007/062059 A | 5/2007 |
| WO | WO 2008/060460 A1 | 5/2008 |
| WO | WO 2009/049168 A1 | 4/2009 |
| WO | WO-2009/049168 A1 * | 4/2009 |

* cited by examiner

ARTICLE PREPARED FROM CLEAN FLUOROPOLYMERS

CROSS-REFERENCE TO RELATED APPLICATION

This application is a divisional of U.S. application Ser. No. 12/682,702, filed on Jul. 13, 2010, which is a U.S. National Stage Application filing under 35 U.S.C. §371 of PCT/US2008/079529, filed Oct. 10, 2008, which claims the benefit of priority to U.S. Provisional Patent Application No. 60/979,688, filed Oct. 12, 2007, the disclosure of which are incorporated by reference herein in their entirety.

TECHNICAL FIELD

The present disclosure relates to fluorinated emulsifiers and in particular relates to fluorinated emulsifiers that are suitable for use in the aqueous emulsion polymerization of fluorinated monomers to produce fluoropolymers.

BACKGROUND

Fluoropolymers, i.e. polymers having a fluorinated backbone, have been long known and have been used in a variety of applications because of several desirable properties such as heat resistance, chemical resistance, weatherability, UV-stability etc. The various fluoropolymers are for example described in "Modern Fluoropolymers", edited by John Scheirs, Wiley Science 1997. Commonly known or commercially employed fluoropolymers include polytetrafluoroethylene (PTFE), copolymers of tetrafluoroethylene (TFE) and hexafluoropropylene (HFP) (FEP polymers), perfluoroalkoxy copolymers (PFA), ethylene-tetrafluoroethylene (ETFE) copolymers, terpolymers of tetrafluoroethylene, and polyvinylidene fluoride polymers (PVDF). Commercially employed fluoropolymers also include fluoroelastomers and thermoplastic fluoropolymers.

Several methods are known to produce fluoropolymers. Such methods include suspension polymerization, aqueous emulsion polymerization, solution polymerization, polymerization using supercritical $CO_2$, and polymerization in the gas phase.

Currently, the most commonly employed polymerization methods include suspension polymerization and aqueous emulsion polymerization. The aqueous emulsion polymerization normally involves polymerization in the presence of a fluorinated emulsifier, which is generally used for stabilization of the polymer particles formed. The suspension polymerization generally does not involve the use of surfactant but results in substantially larger polymer particles than when aqueous emulsion polymerization is used. Thus, polymer particles created using suspension polymerization will quickly settle out whereas polymer particles created using dispersions obtained in emulsion polymerization generally provide good stability over a long period of time.

An aqueous emulsion polymerization where no surfactant is used, or emulsifier free polymerization, is known to generally produce homo- and copolymers of chlorotrifluoroethylene (CTFE). In one such emulsifier free aqueous polymerization, a radical initiator system of a reducing agent and oxidizing agent is used to initiate the polymerization, where the initiator system is added in one or more further charges during the polymerization. These types of emulsifier free polymerizations are also known.

Notwithstanding the fact that emulsifier free polymerizations are known, a process using aqueous emulsion polymerization in the presence of fluorinated emulsifiers is still a desirable process to produce fluoropolymers because it results in stable fluoropolymer particle dispersions in high yield. Frequently, the emulsion polymerization process is carried out using a perfluoroalkanoic acid or salt thereof as an emulsifier. These emulsifiers are typically used because they provide a wide variety of desirable properties, such as high speed of polymerization, good copolymerization properties of fluorinated olefins with comonomers, small particle sizes of the resulting dispersion, desirable stability, and good polymerization yields, i.e. a high amount of solids can be produced. However, environmental concerns have been raised with regard to using these types of emulsifiers. In particular, perfluorinated alkanoic acids having 8 or more carbon atoms and their salts, which have been hereto a preferred class of perfluorinated emulsifiers, are now known to be bio-accumulating. Moreover, these emulsifiers are generally expensive.

Alternative emulsifiers to the perfluoroalkanoic acids or salts thereof have been proposed in the art for conducting the emulsion polymerization of fluorinated monomers. For example, emulsifiers of the general formula Rf—$C_2H_4$—$SO_3M$, wherein Rf represents a perfluorinated aliphatic group and wherein M represents a cation, have been disclosed. Other exemplary partially fluorinated emulsifiers of the general formula Rf—$(CH_2)$m-R'f-COOM have been disclosed, where Rf represents a perfluoroalkyl group or a perfluoroalkoxy group of 3 to 8 carbon atoms, R'f represents a perfluoroalkylene of 1 to 4 carbon atoms and m is 1-3. Perfluoroalkoxy benzene sulfonic acids and salts thereof have been disclosed in the aqueous emulsion polymerization of fluorinated monomers. Functionalized perfluoropolyethers of the general formula: F—$(CF_2)$m-O—[CFX—$CF_2$—O]n—CFX—COOA are known, where m is 1 to 5, X is F or $CF_3$, A is a monovalent cation and n is 0 to 10. In particular, perfluoropolyether acids are taught as emulsifiers in the emulsion polymerization of ethylenically unsaturated monomers. Other known fluorinated polyethers include those having the formula:

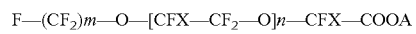

F—$(CF_2)m$—O—[CFX—$CF_2$—O]$n$—CFX—COOA wherein m is 3 to 10, X is F or a perfluoroalkyl group, n is 0, 1 or 2 and A is the counter ion of the carboxylic anion. These functionalized polyethers are taught as emulsifiers in the emulsion polymerization of fluorinated olefins. Fluorinated emulsifiers of the formula: $C_2F_5O(CF_2CF_2O)_mCF_2COOA$, where A is a hydrogen atom, an alkali metal or $NH_4^+$, and m is an integer from 1 to 3 are also known as alternative emulsifiers.

The use of perfluoropolyethers as co-emulsifiers, or emulsifiers that require the presence of other emulsifiers, such as perfluoropolyether acids in an aqueous emulsion polymerization is known. For example, the use of microemulsion prepared from perfluoropolyethers having neutral end groups in an aqueous emulsion polymerization of fluorinated monomers has been disclosed. It is known that certain perfluoropolyethers having carboxylic acid groups or salts thereof at both end groups, i.e. the perfluoropolyethers are bifunctional. The functionalized and/or unfunctionalized perfluoropolyethers are taught for use in aqueous dispersions of fluoropolymers and in the preparation of such dispersion by aqueous emulsion polymerization. The use of a combination of perfluoropolyether surfactants having a carboxylic acid group or salt thereof with a fluoroalkyl carboxylic acid or sulfonic acid or salt thereof are also known. It is taught that the perfluoropolyether surfactants on their own are not very powerful surfactants. Fluorinated ether surfactants for emulsion polymerization and oligomers from VDF are also known for emulsion polymerization.

While there have been advances in alternative emulsifiers, fluoroelastomers derived from known alternative emulsifiers have metal contents that are too high for some applications. In particular, fluoroelastomers can be used in the semiconductor industry in microchip manufacturing where the fluoroelastomer may be used in seats of microchip fabrication equipment. During microchip manufacturing, the fluoroelastomer can be exposed to high temperature and aggressive chemicals. Besides resistance to aggressive chemical and/or heat, it is also desirable for fluoroelastomers to have low glass transition temperatures, which makes them suitable for use at low temperatures as is required, for example, in applications in automobiles or aircraft industries. While fluoroelastomers, and in particular perfluoroelastomers are already being used in the semiconductor industry, there continues to be a need to modify the polymerization of these fluoroelastomers to eliminate the use of perfluoroalkanoic acid or salt thereof so as to make them more suitable for this specialized application. In particular, there is a need to modify the polymerization such that fluoroelastomers having a low metal content result. Specifically, there is a need for an alternative emulsifier that does not create fluoroelastomer compositions having high amounts of metal cations, which limits their suitability for use in the microchip manufacturing. Desirably, the alternative emulsifier is biodegradable and has a low retention time in the human body.

The present disclosure is directed to an alternative fluorinated emulsifier that provides improved quality, for example lower metal content and good compression set, of resulting elastomers, in particular those having a low glass transition temperature. Low metal content in resulting elastomers is important in semi-conductor applications where the resulting elastomers are used as sealing materials. In another aspect of the present disclosure, alternative fluorinated emulsifier concentrations in the resulting elastomers are relatively low, which results in beneficial effects on cure chemistry for articles derived from these elastomers.

SUMMARY

It has been found that emulsifiers according to the general formula (I) below eliminate more quickly from a living organism, as demonstrated on rat screening studies, than perfluoro alkanoic acids having 8 or more carbon atoms. Additionally, it has been found that these emulsifiers can be used in the emulsion polymerization of fluorinated monomers to produce fluoropolymer dispersions and can be recovered there from in an easy and convenient way. Because of their lower bio-accumulation, emulsifiers according to the general formula (I) below should provide less of an environmental burden in case of small losses of these compounds. Also, the process of reducing the amount of these emulsifiers in the dispersion should be more beneficial for operators of the process that may be exposed, for example accidentally, to these emulsifiers used in work-up procedures following the recovery from the dispersion.

It has also been found that using emulsifiers according to the general formula (I) below fluoroelastomers, in particular those having a low glass transition temperature, can be prepared that have a low metal content, in particularly a lower metal content than using perfluoroalkanoic acid surfactants.

Briefly, in one aspect, the present disclosure provides a fluorinated elastomer dispersion including an aqueous mixture of a crosslinkable fluorinated elastomer and a fluorinated emulsifier represented by the formula:

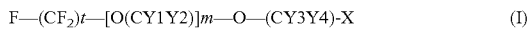

$$F—(CF_2)t—[O(CY1Y2)]m—O—(CY3Y4)-X \quad (I)$$

wherein CY1Y2 represents a perfluorinated or partially fluorinated linear alkylene having from 1 to 4 carbon atoms, CY3Y4 represents a perfluorinated, partially fluorinated or non-fluorinated, linear alkylene having from 1 to 4 carbon atoms, t is from 1 to 10, m is 0 to 3; X is selected from a group consisting of a carboxyl acid group and a salt of a carboxylic acid group.

In another embodiment, the present disclosure provides a fluorinated elastomer dispersion including an aqueous mixture of a crosslinkable fluorinated elastomer and a fluorinated emulsifier represented by the formula:

$$F—(CF_2)t—[O(CF_2)n]m—O—(CHF)o—(CF_2)p—X \quad (Ia)$$

where m=0 to 3; n=1 to 5; o=0 to 1; p=1 to 3; t=1 to 10; and where when t=2 than o≠0. X is selected from a group consisting of a carboxyl acid group and a salt of a carboxylic acid group.

In another aspect, the present disclosure provides a fluoroelastomer derived from emulsion polymerization comprising a fluorinated emulsifier represented by the formula (I) or (Ia) as defined above. X, m, n, o, p, and t were defined above. The presently disclosed fluoroelastomer is essentially free of cations (other than $NH_4^+$ and $H^+$) before adding cure chemicals and other ingredients.

In yet another aspect, the present disclosure provides a fluoroelastomer obtained by a process including: (a) polymerizing a fluoromonomer and a cure site monomer in an aqueous emulsion polymerization process to form an aqueous dispersion; (b) coagulating the dispersion with a metal salt to form a coagulated fluoropolymer; (c) drying the coagulated fluoropolymer. The polymerization process is carried out with the aid of a fluorinated emulsifier as defined above in respect to formula (I) or (Ia). X, m, n, o, p, and t were defined above. The presently disclosed fluoroelastomer is essentially free of cations (other than $NH_4^+$ and $H^+$) before adding cure chemicals and other ingredients.

In still another aspect, the present disclosure provides an article prepared from a fluoroelastomer derived from an emulsion polymerization comprising a fluorinated emulsifier represented by the formula (I) or (Ia) as defined above. X, m, n, o, p, and t were defined above. The presently disclosed fluoroelastomer is essentially free of cations (other than $NH_4^+$ and $H^+$) before adding cure chemicals and other ingredients.

In some embodiments, the fluoroelastomer includes a polymer derived from at least one fluoromonomer selected from tetrafluoroethylene, vinylidene fluoride, hexafluoropropylene, a perfluoro(alkyl or alkoxyalkyl vinyl ether) represented by $CF_2=C(OR^f)nF_2-n$, where $R^f$ is a C1-9 perfluoroalkyl group or perfluoro(alkoxyalkyl) group containing one or more ether bonds, n is an integer of 1 or 2, and each carbon chain may be linear or contain branches, or may have a cyclic structure, and chlorotrifluoroethylene, propylene and ethylene, a perfluoro(alkyl or alkyoxyalkyl allyl ether) represented by $CF_2=C-CF_2-C(OR^f)nF_2-n$, where $R^f$ is a C1-9 perfluoroalkyl group or perfluoro(alkoxyalkyl) group containing one or more ether bonds, n is an integer of 1 or 2, and each carbon chain may be linear or contain branches, or may have a cyclic structure, and chlorotrifluoroethylene, propylene and ethylene and optionally, a cure site monomer, and combinations thereof.

In some embodiments, the fluoroelastomer is a copolymer comprising repeating units derived from at least one copolymer selected from a tetrafluoroethylene/propylene copolymer, a tetrafluoroethylene/propylene/vinylidene fluoride copolymer, a vinylidene fluoride/hexafluoropropylene copolymer, a tetrafluoroethylene/vinylidene fluoride/hexafluoropropylene copolymer, a tetrafluoroethylene/perfluoro(alkylallyl)ether copolymer, a tetrafluoroethylene/perfluoro (alkyoxyalkylallyl)ether copolymer, a tetrafluorethylene/perfluoro(alkylvinyl)ether copolymer, a tetrafluoroethylene/perfluoro(alkoxyalkylvinyl)ether copolymer, a tetrafluoroethylene/$CF_2$=$CFOCF_3$ copolymer, a tetrafluoroethylene/$CF_2$=$CFOC_3F_7$ copolymer, a tetrafluoroethylene/$CF_2$=$CFOCF_3$/$CF_2$=$CFOC_3F_7$ copolymer, a tetrafluoroethylene/$CF_2$=$C(OC_2F5)_2$ copolymer, a vinylidene fluoride/$CF_2$=$CFOC_3F_7$ copolymer, an ethylene/hexafluoropropylene copolymer, an ethylene/chlorotrifluoroethylene copolymer, a vinylidene fluoride/chlorotrifluoroethylene copolymer, a tetrafluoroethylene/hexafluoropropylene/vinylidene fluoride/chlorotrifluoroethylene copolymer, and such a copolymer having a cure site monomer further copolymerized therewith, and combination thereof.

In some embodiments the fluoroelastomer contains repeating units derived from vinylidene fluoride and has a glass transition temperature (Tg) of less than −20° C. In some embodiments the fluoroelastomer contains repeating units derived from tetrafluoroethlyene and has a glass transition temperature (Tg) of less than −10° C.

The above summary of the present disclosure is not intended to describe each embodiment. The details of one or more embodiments are also set forth in the description below. Other features, objects, and advantages will be apparent from the description and from the claims.

DETAILED DESCRIPTION

The presently disclosed fluorinated elastomer dispersion may be produced by emulsion-polymerizing a fluoromonomer in an aqueous medium containing the fluorinated emulsifier represented by the formula:

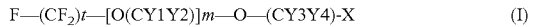

F—(CF$_2$)$t$—[O(CY1Y2)]$m$—O—(CY3Y4)-X       (I)

wherein CY1Y2 represents a perfluorinated or partially fluorinated linear alkylene having from 1 to 4 carbon atoms, CY3Y4 represents a perfluorinated, partially fluorinated or non-fluorinated, linear alkylene having from 1 to 4 carbon atoms, t is from 1 to 10, m is 0 to 3; X is selected from a group consisting of a carboxyl acid group and a salt of a carboxylic acid group.

In some embodiments the fluorinated emulsifier corresponds to the general

F—(CF$_2$)$t$—[O(CF$_2$)$n$]$m$—O—(CHF)$o$—(CF$_2$)$p$—X       (Ia)

The presently disclosed fluorinated elastomer dispersion may also be produced by adding the fluorinated emulsifier represented by the formula (I) or (Ia) to a fluoromonomer in an aqueous medium containing an emulsifier other than the fluorinated emulsifier represented by the formula (I) or (Ia).

The presently disclosed fluoroelastomers are derived from an emulsion comprising a fluorinated emulsifier represented by the formula (I) or (Ia). The term fluoroelastomer is herein defined as a fluoropolymer that can be cured (cross-linked) by a thermal treatment process, preferably in the presence of curatives.

Curable fluoroelastomer compositions as used herein define a material/mixture comprised of a fluoroelastomer and one or more curatives that can be cured, or vulcanized, by a thermal treatment process. The curable compositions may further comprise fillers, including inorganic and polymeric fillers, such as fluoropolymers like PFA, FEP and PTFE; and the like, such that the material/mixture can be cured, or vulcanized, by a thermal treatment process. The presently disclosed fluoroelastomers are essentially free of extractable ions. The phrase "essentially free" as used herein means that less than 500 ppm, preferably less than 200 ppm, and more preferably less than 150 ppm cations (other than $NH_4^+$ and $H^+$) are found in the fluoropolymer (before adding cure chemicals and other ingredients). Articles derived from the presently disclosed fluoroelastomer or curable fluoroelastomer compositions have low metal content (i.e. are essentially free of cations (other than $NH_4^+$ and $H^+$) before adding cure chemicals and other ingredients or after using essentially metal-free cure chemical and other ingredients). The article may exhibit good compression set.

The fluoromonomer to be subjected to emulsion polymerization may be a fluoromonomer selected from TFE, VDF, HFP, perfluoromethyl vinyl ether (PMVE) and ethene (ET), a perfluoro(alkyl or alkoxyalkyl vinyl ether) represented by $CF_2$=$C(OR^f)_nF_{2-n}$, wherein $R^f$ is a C1-9 perfluoroalkyl group or perfluoro(alkoxyalkyl) group containing one or more ether bonds, n is 1 or 2, and each carbon chain may be linear or contain branches, or may have cyclic structure (PAVE), a perfluoro(alkyl or alkoxyalkyl allyl ether) represented by $CF_2$=$C$—$CF_2$—$(OR^f)_nF_{2-n}$, wherein $R^f$ is a C1-9 perfluoroalkyl group or perfluoro(alkoxyalkyl) group containing one or more ether bonds, n is 1 or 2, and each carbon chain may be linear or contain branches, or may have cyclic structure and a combination thereof. With the fluoromonomer, one or more copolymerizable hydrocarbon monomers selected from a vinyl ether represented by $CH_2$=CHOR, where R is a C1-8 alkyl group or alkoxyalkyl group containing one or more ether bonds, and each carbon chain may be linear or contain branches, or may have a cyclic structure, propene (P) and ET may be copolymerized.

In some embodiments, another monomer may be copolymerized. Such copolymerizable monomer may be from 0.001 to 10 mol % (based on the total amount of monomers of the polymer) of a cure site monomer, including, for example, a carbon-carbon double bond group, a halogen atom, an acid anhydride residue, a carboxyl group, an amino group, a cyano group or a hydroxyl group. Exemplary cure site monomers include 1-bromo-1,1,2,2-tetrafluoroethyl trifluorovinyl ether (hereinafter referred to as BrVE), 1-iodo-1,1,2,2-tetrafluoroethyl trifluorovinyl ether, $CH_2$=CHI, $CF_2$=CHI, $CF_2$=CFI, $CH_2$=CHCH$_2$I, $CF_2$=CFCF$_2$I, $CH_2$=CHCF$_2$CF$_2$I, $CF_2$=CFCH$_2$CH$_2$I, $CF_2$=CFCF$_2$CF$_2$I, $CH_2$=CH(CF$_2$)$_6$CH$_2$CH$_2$I, $CF_2$=CFOCF$_2$CF$_2$I, $CF_2$=CFOCF$_2$CF$_2$CF$_2$I, $CF_2$=CFOCF$_2$CF$_2$CH$_2$I, $CF_2$=CFCF$_2$OCH$_2$CH$_2$I, $CF_2$=CFO(CF$_2$)$_3$—OCF$_2$CF$_2$I, $CH_2$=CHBr, $CF_2$=CHBr, $CF_2$=CFBr (BTFE), $CH_2$=CHCH$_2$Br, $CF_2$=CFCF$_2$Br, $CH_2$=CHCF$_2$CF$_2$Br (BTFB), $CF_2$=CFOCF$_2$CF$_2$Br, vinyl crotonate, vinyl methacrylate, maleic anhydride, itaconic anhydride, maleic acid, itaconic acid. In some embodiments the cure site monomers are derived from one or more compounds of the formula: a) $CX_2$=CX(Z), wherein: (i) X each is independently H or F; and (ii) Z is I, Br, $R^f$—U wherein U=I or Br and $R_f$=a perfluorinated or partially perfluorinated alkylene group optionally containing O atoms. In addition, non-fluorinated bromo- or iodo-olefins, e.g., vinyl iodide and allyl iodide, can be used.

In some embodiments, cure site monomers include nitrogen-containing cure site monomers, such as heptafluoro-4-pentenenitrile, or other nitrile-containing fluorinated olefins and nitrile-containing fluorinated vinyl ethers, including: $CF_2$=CFO(CF$_2$)$_L$CN CF$_2$=CFO[CF$_2$CF(CF$_3$)O]$_q$(CF$_2$O)$_y$CF(CF$_3$)CN
CF$_2$=CF[OCF$_2$CF(CF$_3$)]$_r$O(CF$_2$)$_t$CN
CF$_2$=CFO(CF$_2$)$_u$OCF(CF$_3$)CN where, in reference to the above formulas, L=2-12; q=0-4; r=1-2; y=0-6; t=1-4; and u=2-6. Representative examples of such monomers include CF$_2$=CFO(CF$_2$)$_3$OCF(CF$_3$)CN, perfluoro(8-cyano-5-methyl-3,6-dioxa-1-octene), and CF$_2$=CFO(CF$_2$)$_5$CN, and a combination thereof. The proportion of such a cure site monomer in the copolymer is preferably from 0.001 to 5 mol %, and even from 0.01 to 3 mol %.

Exemplary copolymers derived from the fluorinated monomers include copolymers comprising repeating units derived from TFE and P; TFE, P and VDF; VDF, HFP; TFE, VDF, HFP; TFE, PMVE; TFE, CF$_2$=CFOC$_3$F$_7$; TFE, CF$_2$=CFOCF$_3$, CF$_2$=CFOC$_3$F$_7$; TFE, CF$_2$=C(OC$_2$F$_5$)$_2$; TFE, methyl vinyl ether (MVE); TFE, ethyl vinyl ether (EVE); TFE perfluoroalkylvinyl ether; TFE, perfluoroalkoxyalkylvinyl ether; TFE, perfluoroalkylally ether; TFE, perfluoroalkoxyalkyl ether; TFE, butyl vinyl ether (BVE); TFE, EVE, BVE; VDF, CF$_2$=CFOC$_3$F$_7$; ET, HFP; and such copolymers having a cure site monomer further copolymerized therewith.

Suitable perfluorinated ethers include those of the formula:

$$CF_2=CFO-(CF_2)_m-(O(CF_2)_p)_n-OR_f \quad \text{(Formula 2)}$$

wherein R$_f$ is a perfluorinated (C1-C4) alkyl group, m=1-4, n=0-6, and p=1-2, or $$CF_2=CF(CF_2)_m-O-R_f \quad \text{(Formula 3)}$$

wherein: m=1-4; R$_f$ is a perfluorinated aliphatic group optionally containing O atoms, or CF$_2$=CFO(CF$_2$)$_p$OR$_f$ (formula 2a), wherein p represents 2, 3, 4, 5 or 6 and R$_f$ represents a perfluorinated (C1-C6) alkyl or alkoxyalkyl group, or CF$_2$=CF(OCF$_2$CF$_2$)$_r$OR$_f$, wherein r represents 1, 2, 3 or 4 and R$_f$ represents a perfluorinated (C1-C6) alkyl or alkoxyalkyl group. These perfluorinated ethers may be pre-emulsified with an emulsifier prior to its copolymerization with the other comonomers.

Exemplary perfluoroalkoxy vinyl ethers include CF$_2$=CFOCF$_2$OCF$_3$, CF$_2$=CFOCF$_2$OCF$_2$CF$_3$, CF$_2$=CFOCF$_2$CF$_2$OCF$_3$, CF$_2$=CFOCF$_2$CF$_2$CF$_2$OCF$_3$, CF$_2$=CFOCF$_2$CF$_2$CF$_2$CF$_2$OCF$_3$, CF$_2$=CFOCF$_2$OCF$_2$CF$_3$, CF$_2$=CFOCF$_2$CF$_2$OCF$_2$CF$_3$, CF$_2$=CFOCF$_2$CF$_2$CF$_2$OCF$_2$CF$_3$, CF$_2$=CFOCF$_2$CF$_2$CF$_2$CF$_2$OCF$_2$CF$_3$, CF$_2$=CFOCF$_2$CF$_2$OCF$_2$OCF$_3$, CF$_2$=CFOCF$_2$CF$_2$OCF$_2$CF$_2$OCF$_3$, CF$_2$=CFOCF$_2$CF$_2$OCF$_2$CF$_2$CF$_2$OCF$_3$, CF$_2$=CFOCF$_2$CF$_2$OCF$_2$CF$_2$CF$_2$CF$_2$OCF$_3$, CF$_2$=CFOCF$_2$CF$_2$OCF$_2$CF$_2$CF$_2$CF$_2$CF$_2$OCF$_3$, CF$_2$=CFOCF$_2$CF$_2$(OCF$_2$)$_3$OCF$_3$, CF$_2$=CFOCF$_2$CF$_2$(OCF$_2$)$_4$OCF$_3$, CF$_2$=CFOCF$_2$CF$_2$OCF$_2$OCF$_2$OCF$_3$, CF$_2$=CFOCF$_2$CF$_2$OCF$_2$CF$_2$CF$_3$ and CF$_2$=CFOCF$_2$CF$_2$OCF$_2$CF$_2$OCF$_2$CF$_2$CF$_3$. Mixtures of perfluoroalkyl vinyl ethers and perfluoroalkoxy vinyl ethers may also be employed. Perfluoroolefins useful in the present disclosure include those of the formula: CF$_2$=CF—R$_f$; where R$_f$ is fluorine or a perfluoroalkyl of 1 to 8, preferably 1 to 3, carbon atoms.

Exemplary perfluoroalkoxy allyl ethers include CF$_2$=CFCF$_2$OCF$_2$CF$_2$OCF$_3$, CF$_2$=CFCF$_2$OCF$_2$CF$_2$CF$_2$OCF$_3$ and CF$_2$=CFCF$_2$OCF$_3$.

The molar ratio of polymerized units of the respective monomers in the copolymer is not particularly limited and may suitably be selected depending upon required characteristics. Exemplary molar ratios of (the polymerized units of TFE)/(the polymerized units of P) in the TFE/P copolymer include from 40/60 to 70/30, and even from 50/50 to 60/40. In the TFE/PAVE copolymer, the perfluoroalkyl group of PAVE has from 1 to 9 carbon atoms, and it may be linear or contain branches, or may have a cyclic structure or a mixture thereof. The perfluoroalkyl group is more preferably a CF$_3$ group or a C$_3$F$_7$ group. Further, the perfluoro(alkoxyalkyl) group, like for example in PAVE, having one or more ether bonds and has from 1 to 9 carbon atoms, it has preferably four or less, more preferably two or less ether bonds, and it may be linear or contain branches, or may have a cyclic structure, or a mixture thereof. Such a perfluoro(alkoxyalkyl) group is more preferably a C$_2$F$_5$OC$_2$F$_4$ group, a C$_3$F$_7$OC$_3$F$_6$ group, a C$_3$F$_7$OC$_3$F6OC$_3$F$_6$ group, or a CF$_3$—O—(CF$_2$)$_3$ group.

Exemplary mole ratios of various fluoroelastomers include a TFE (40 to 60 mol %)/P (60 to 40 mol %) copolymer, a TFE (20 to 79 mol %)/P (79 to 20 mol %)/VDF (1 to 50 mol %) copolymer, a TFE (20 to 80 mol %)/HFP (80 to 20 mol %) copolymer, a VDF (50 to 95 mol %)/HFP (5 to 50 mol %) copolymer, a TFE (1 to 35 mol %)/VDF (45 to 90 mol %)/HFP (5 to 50 mol %) copolymer, a TFE (40 to 70 mol %)/CF$_2$=CFOCF$_3$ (60 to 30 mol %) copolymer, a TFE (40 to 70 mol %)/CF$_2$=CFOC$_3$F$_7$ (60 to 30 mol %) copolymer, a TFE (40 to 70 mol %)/CF$_2$=C(OC$_2$F$_5$)$_2$ (60 to 30 mol %) copolymer, a TFE (70 to 30 mol %)/MVE (30 to 70 mol %) copolymer, a TFE (70 to 30 mol %)/EVE (30 to 70 mol %) copolymer, a TFE (70 to 30 mol %)/PMVE (30 to 70 mol %) copolymer, a TFE (60 to 30 mol %)/EVE (1 to 69 mol %)/BVE (1 to 69 mol %) copolymer, a VDF (40 to 70 mol %)/CF$_2$=CFOC$_3$F$_7$ (60 to 30 mol %) copolymer, an ET (40 to 60 mol %)/HFP (60 to 40 mol %) copolymer, and such copolymers having a cure site monomer further copolymerized therewith in an amount of from 0.001 to 10 mol %. For clarity, the TFE (40 to 60 mol %)/P (60 to 40 mol %) copolymer means a copolymer obtained by copolymerizing TFE and P in a ratio of 40 to 60 mol %:60 to 40 mol %, and the same applies to other copolymers. Further, the TFE (40 to 60 mol %)/P (60 to 40 mol %) copolymer having a cure site monomer further copolymerized therewith in an amount of from 0.001 to 10 mol %, means such a copolymer that the ratio of two components TFE and P in the copolymer is 40 to 60 mol %:60 to 40 mol %, and the proportion of the cure site monomer in the copolymer is from 0.001 to 10 mol % based on the total amount of three monomer components. The same applies to other copolymers.

In some embodiments the fluoroelastomer described above has a glass transition temperature (Tg) of less than −10° C. or even less than −20° C. as determined by differential scanning calorimetry in heating mode with a heating rate of 10° C. per minute, inflection point of transition. For example, the fluoroelastomer may comprise repeating units derived from vinylidene fluoride and may have a glass transition temperature of less than −20° C. as determined by differential scanning calorimetry in heating mode with a heating rate of 10° C. per minute, inflection point of transition, or the fluoroelastomer may comprise repeating units derived from tetrafluoroethylene and may have a glass transition temperature of less than −10° C. as determined by differential scanning calorimetry in heating mode with a heating rate of 10° C. per minute, inflection point of transition. U.S. Pat. No. 5,268,405 discloses fluoroelastomers blended with a perfluoropolyether in order to reduce the glass transition temperature of the composition.

The presently disclosed fluoroelastomer is characterized by containing one type or more types of fluorinated emulsifiers represented by the formula:

$$F—(CF_2)t—[O(CY1Y2)]m—O—(CY3Y4)-X \quad (I)$$

wherein CY1Y2 represents a perfluorinated or partially fluorinated linear alkylene having from 1 to 4 carbon atoms, CY3Y4 represents a perfluorinated, partially fluorinated or non-fluorinated, linear alkylene having from 1 to 4 carbon atoms, t is from 1 to 10, m is 0 to 3; X is selected from a group consisting of a carboxyl acid group and a salt of a carboxylic acid group.

Examples of CY1Y2 include—but are not limited to—the following: $(CF_2)n$ with n being 1, 2, 3 or 4, CHF, CHF—$CF_2$, $CF_2$—CHF, $CF_2$—CHF—$CF_2$, CHF—CHF, CHF—CHF—CHF—CHF, CHF—CHF—CHF—$CF_2$, CHF—CHF—$CF_2$—CHF, CHF—CHF—$CF_2$—$CF_2$, $CF_2$—$CF_2$—CHF.

Examples of CY3Y4 include—but are not limited to—the following: $CH_2$, $CH_2CH_2$, $CF_2$, $CF_2CF_2$, CHF, $CF_2$CHF, $CF_2$CHF$CF_2$, In some embodiments, t is from 1 to 3 and m is from 0 to 2.

In some embodiments, t is from 1 to 3 and m is from 0 to 2 and CY1Y2 include at least one CHF group.

In some embodiments, t is from 1 to 3 and m is from 0 to 2 and CY1Y2 includes at least one $CF_2$ group.

In some embodiments, t is from 1 to 3 and m is from 0 to 2 and CY1Y2 is a perfluorinated alkylene containing 1 to 4, preferably 2 or 3 carbon atoms.

In some embodiments, t is from 1 to 3 and m is from 0 to 2 and CY1Y2 include at least one CHF group and CY3Y4 represents one of the following: $CH_2$, $CH_2CH_2$, $CF_2$, $CF_2CF_2$, CHF, $CF_2$CHF, $CF_2$CHF$CF_2$.

In some embodiments, t is from 1 to 3 and m is from 0 to 2 and CY1Y2 includes at least one CF2 group and CY3Y4 represents one of the following: $CH_2$, $CH_2CH_2$, $CF_2$, $CF_2CF_2$, CHF, $CF_2$CHF, $CF_2$CHF$CF_2$.

In some embodiments, t is from 1 to 3 and m is from 0 to 2 and CY1Y2 is a perfluorinated alkylene containing 1 to 4, preferably 2 or 3 carbon atoms and CY3Y4 represents one of the following: $CH_2$, $CH_2CH_2$, $CF_2$, $CF_2CF_2$, CHF, $CF_2$CHF, $CF_2$CHF$CF_2$.

In some embodiments the presently disclosed fluoroelastomer is characterized by containing one type or more types of fluorinated emulsifiers represented by the formula:

$$F—(CF_2)t—[O(CF_2)n]m—O—(CHF)o—(CF_2)p—X \quad (I)$$

where m=0 to 3; n=1 to 5; o=0 to 1; p=1 to 3; t=1 to 10; and wherein when t=2 than o≠0, and also where X is a carboxyl acid group, a salt of a carboxylic acid group or a combination thereof.

The following may be mentioned as examples of the fluorinated emulsifier.

F—$CF_2$—O—$(CF_2)_2$—X
F—$CF_2$—O—$(CF_2)_3$—X
F—$(CF_2)t$-O—$CF_2$—X (where t=3 to 10)
F—$(CF_2)t$-O—CHF—$CF_2$—X (where t=1 to 10)
F—$(CF_2)t$-O—$(CF_2)_2$—X (where t=3 to 10)
F—$(CF_2)t$-O—CHF—$(CF_2)_2$—X (where t=1 to 10)
F—$(CF_2)t$-O—$(CF_2)_3$—X (where t=3 to 10)
F—$(CF_2)t$-O—CHF—$(CF_2)_3$—X (where t=1 to 10)
F—$CF_2$—$OCF_2$—O—$CF_2$—X
F—$(CF_2)t$-$OCF_2$—O—$CF_2$—X (where t=3 to 10)
F—$(CF_2)t$-$OCF_2$—O—CHF—$CF_2$—X (where t=1 to 10)
F—$CF_2$—$OCF_2$—O—$(CF_2)_2$—X
F—$(CF_2)t$-$OCF_2$—O—$(CF_2)_2$—X (where t=3 to 10)
F—$(CF_2)t$-$OCF_2$—O—CHF—$(CF_2)_2$—X (where t=1 to 10)
F—$CF_2$—$OCF_2$—O—$(CF_2)_3$—X
F—$(CF_2)t$-$OCF_2$—O—$(CF_2)_3$—X (where t=3 to 10)
F—$(CF_2)t$-$OCF_2$—O—CHF—$(CF_2)_3$—X (where t=1 to 10)
F—$CF_2$—$[OCF_2]_2$—O—$CF_2$—X
F—$(CF_2)t$-$[OCF_2]_2$—O—$CF_2$—X (where t=3 to 10)
F—$(CF_2)t$-$[OCF_2]_2$—O—CHF—$CF_2$—X (where t=1 to 10)
F—$CF_2$—$[OCF_2]_2$—O—$(CF_2)_2$—X
F—$(CF_2)t$-$[OCF_2]_2$—O—$(CF_2)_2$—X (where t=3 to 10)
F—$(CF_2)t$-$[OCF_2]_2$—O—CHF—$(CF_2)_2$—X (where t=1 to 10)
F—$CF_2$—$[OCF_2]_2$—O—$(CF_2)_3$—X
F—$(CF_2)t$-$[OCF_2]_2$—O—$(CF_2)_3$—X (where t=3 to 10)
F—$(CF_2)t$-$[OCF_2]_2$—O—CHF—$(CF_2)_3$—X (where t=1 to 10)
F—$CF_2$—$[OCF_2]_3$—O—$CF_2$—X
F—$(CF_2)t$-$[OCF_2]_3$—O—$CF_2$—X (where t=3 to 10)
F—$(CF_2)t$-$[OCF_2]_3$—O—CHF—$CF_2$—X (where t=1 to 10)
F—$CF_2$—$[OCF_2]_3$—O—$(CF_2)_2$—X
F—$(CF_2)t$-$[OCF_2]_3$—O—$(CF_2)_2$—X (where t=3 to 10)
F—$(CF_2)t$-$[OCF_2]_3$—O—CHF—$(CF_2)_2$—X (where t=1 to 10)
F—$CF_2$—$[OCF_2]_3$—O—$(CF_2)_3$—X
F—$(CF_2)t$-$[OCF_2]_3$—O—$(CF_2)_3$—X (where t=3 to 10)
F—$(CF_2)t$-$[OCF_2]_3$—O—CHF—$(CF_2)_3$—X (where t=1 to 10)

In some embodiments, the fluorinated emulsifier includes the following compounds:
$F(CF_2)$—O—$(CF_2)_3$—O—$CF_2$—X
$F(CF_2)$—O—$(CF_2)_3$—O—CHF—$CF_2$—X.

Other exemplary fluorinated emulsifiers include those having the formula:

$$[R_f—O-L-COO^{\ominus}]_i X^{i+} \quad (IV)$$

where L represents a linear partially or fully fluorinated alkylene group or an aliphatic hydrocarbon group, $R_f$ represents a linear partially or fully fluorinated aliphatic group or a linear partially or fully fluorinated aliphatic group interrupted with one or more oxygen atoms, $X^{i+}$ represents a cation having the valence i and i is 1, 2 or 3. Specific examples of compounds according to the formula (IV) include the following:

$R_f$—O—CHF—COOH
$C_3F_7$—O—CHF—COOH
$CF_3$—O—$CF_2CF_2$—$CF_2$—O—CHF—COOH
$CF_3CF_2$—O—$CF_2CF_2$—$CF_2$—O—CHF—COOH
$CF_3$—O—$CF_2$—$CF_2$—O—CHF—COOH
$CF_3$—O—$CF_2$—O—$CF_2$—$CF_2$—O—CHF—COOH
$CF_3$—(O—$CF_2$)$_2$—O—$CF_2$—$CF_2$—O—CHF—COOH
$CF_3$—(O—$CF_2$)$_3$—O—$CF_2$—$CF_2$—O—CHF—COOH
$R_f$—O—CHF—$CF_2$—COOH
$CF_3$—O—CHF—$CF_2$COOH
$CF_3$—O—$CF_2$—$CF_2$—O—CHF—$CF_2$—COOH
$CF_3$—$CF_2$—O—CHF—$CF_2$—COOH
$CF_3$—O—$CF_2$—$CF_2$—$CF_2$—O—CHF—$CF_2$—COOH
$CF_3$—O—$CF_2$—O—$CF_2$—$CF_2$—O—CHF—$CF_2$—COOH
$CF_3$—(O—$CF_2$)$_2$—O—$CF_2$—$CF_2$—O—CHF—$CF_2$—COOH
$CF_3$—(O—$CF_2$)$_3$—O—$CF_2$—$CF_2$—O—CHF—$CF_2$—COOH
$R_f$—O—$CF_2$—CHF—COOH
$CF_3$—O—$CF_2$—CHF—COOH
$C_3F_7$—O—$CF_2$—CHF—COOH
$CF_3$—O—$CF_2$—$CF_2$—$CF_2$—O—$CF_2$—CHF—COOH
$CF_3$—O—$CF_2$—O—$CF_2$—$CF_2$—O—$CF_2$—CHF—COOH
$CF_3$—(O—$CF_2$)$_2$—O—$CF_2$—$CF_2$—O—$CF_2$—CHF—COOH $CF_3-(O-CF_2)_3-O-CF_2-CF_2-O-CF_2-CHF-C-OOH$
$R_f-O-CF_2-CHF-CF_2COOH$
$CF_3-O-CF_2-CHF-CF_2-COOH$
$C_2F_5-O-CF_2-CHF-CF_2-COOH$
$C_3F_7-O-CF_2-CHF-CF_2-COOH$
$CF_3-O-CF_2-CF_2-CF_2-O-CF_2-CHF-CF_2-CO-OH$
$CF_3-O-CF_2-O-CF_2-CF_2-O-CF_2-CHF-CF_2-COOH$
$CF_3-(O-CF_2)_2-O-CF_2-CF_2-O-CF_2-CHF-CF_2-COOH$
$CF_3-(O-CF_2)_3-O-CF_2-CF_2-O-CF_2-CHF-CF_2-COOH$
$R_f-(O)_m-CHF-CF_2-O-(CH_2)_n-COOH$ n=1, 2 or 3; m=0 or 1
$CF_3-O-CHF-CF_2-O-CH_2-COOH$
$CF_3-O-CF_2-CF_2-CF_2-O-CHF-CF_2-O-CH_2-COOH$
$C_3F_7-O-CHF-CF_2-O-CH_2-COOH$
$C_3F_7-O-CHF-CF_2-O-CH_2-CH_2-COOH$
$C_3F_7-O-CF_2-CF_2-O-CHF-CF_2-OCH_2COOH$
$C_3F_7-O-CF_2-CF_2-CF_2-O-CHF-CF_2-OCH_2COOH$
$C_3F_7-O-CF_2-CHF-CF_2-OCH_2COOH$
$CF_3-CHF-CF_2-O-CH_2COOH$
$C_3F_7-CF_2-CHF-CF_2-OCH_2-COOH$
$CF_3-O-CF_2-CF_2-O-CH_2-COOH$
$CF_3-O-CF_2-CF_2-CF_2-O-CF_2-CF_2-O-CH_2-COOH$
$C_3F_7-O-CF_2-CF_2-O-CH_2-COOH$
$C_3F_7-O-CF_2-CF_2-O-CH_2-CH_2-COOH$
$C_3F_7-O-CF_2-CF_2-O-CF_2-CF_2-OCH_2COOH$
$C_3F_7-O-CF_2-CF_2-CF_2-CF_2-CF_2-O-CH_2COOH$
$C_3F_7-O-CF_2-CF_2-CF_2-OCH_2COOH$
$C_4F_9-O-CH_2-COOH$
$C_4F_9-O-CH_2-CH_2-COOH$
$C_3F_7-O-CH_2COOH$
$C_6F_{13}-OCH_2-COOH$
$R_f-O-CF_2-CF_2-COOH$
$CF_3-O-CF_2-CF_2-COOH$
$C_2F_5-O-CF_2-CF_2COOH$
$C_3F_7-O-CF_2-CF_2-COOH$
$C_4F_9-O-CF_2-CF_2-COOH$
$R_f-(O-CF_2)_n-O-CF_2-COOH$ with u being as defined above
$CF_3-(O-CF_2)_3-O-CF_2-COOH$
$CF_3-(O-CF_2)_2-O-CF_2-COOH$
$CF_3-(O-CF_2)_n-O-CF_2-COOH$
$R_f-(O-CF_2-CF_2)_k-O-CF_2-COOH$ with k being 1, 2 or 3
$CF_3-(O-CF_2-CF_2)_k-O-CF_2COOH$,
$C_2F_5-(O-CF_2-CF_2)_k-O-CF_2-COOH$
$C_3F_7-(O-CF_2-CF_2)_k-O-CF_2-COOH$
$C_4F_9-(O-CF_2-CF_2)_k-O-CF_2-COOH$
$C_2F_5-(O-CF_2-CF_2)_2-O-CF_2-COOH$
$CF_3-(O-CF_2-CF_2)_2-O-CF_2-COOH$
$C_3F_7-(O-CF_2-CF_2)_2-O-CF_2-COOH$
$C_4F_9-(O-CF_2-CF_2)_2-O-CF_2-COOH$
$R_f-O-CF_2-COOH$
$C_3F_7-O-CF_2-COOH$
$CF_3-O-CF_2-CF_2-CF_2-O-CF_2-COOH$
$CF_3-CHF-O-(CF_2)_o-COOH$ with o being an integer of 1, 2, 3, 4, 5 or 6
$CF_3CFH-O-(CF_2)_3-COOH$
$CF_3CFH-O-(CF_2)_5-COOH$
$CF_3-CF_2-O-(CF_2)_o-COOH$ with o being as above
$CF_3-CF_2-O-(CF_2)_3COOH$
$CF_3-CF_2-O-(CF_2)_5COOH$ The previously disclosed fluorinated emulsifiers can be used alone and/or in combinations thereof.

In the method for producing the presently disclosed fluoroelastomer, a fluoromonomer is emulsion-polymerized in an aqueous medium containing the fluorinated emulsifiers represented by the formula (I).

The aqueous emulsion polymerization results in a fluorinated elastomer composition having a dispersion of the fluoropolymer in water. Generally the amount of solid content of the fluoropolymer in the dispersion directly resulting from the polymerization will vary between 3% by weight and about 50% by weight depending on the polymerization conditions. A typical range is between 5 and 30% by weight, for example between 10 and 25% by weight. The particle size (volume average diameter) of the fluoropolymer is typically between 40 nm and 400 nm with a typical particle size being between 60 nm and about 350 nm. The total amount of fluorinated emulsifier according to formula (I) in the resulting dispersion is typically between 0.001 and 5% by weight based on the amount of fluoropolymer solids in the dispersion. A typical amount may be from 0.01 to 2% by weight or from 0.02 to 1% by weight.

The aqueous emulsion polymerization may be carried out at a temperature between 10° C. to 150° C., preferably 20° C. to 110° C. and the pressure is typically between 2 and 30 bar, in particular 5 to 20 bar. The reaction temperature may be varied during the polymerization to influence the molecular weight distribution.

The pH of the polymerization media may be in the range of pH 2-11, preferably 2-7, most preferably 2-4.

The aqueous emulsion polymerization is typically initiated by an initiator including any of the initiators known for initiating a free radical polymerization of fluorinated monomers. Suitable initiators include peroxides and azo compounds and redox based initiators. Specific examples of peroxide initiators include, hydrogen peroxide, sodium or barium peroxide, diacylperoxides such as diacetylperoxide, disuccinyl peroxide, dipropionylperoxide, dibutyrylperoxide, dibenzoylperoxide, benzoylacetylperoxide, diglutaric acid peroxide and dilaurylperoxide, and further per-acids and salts thereof such as e.g. ammonium, sodium or potassium salts. Examples of per-acids include peracetic acid. Esters of the peracid can be used as well and examples thereof include tert.-butylperoxyacetate and tert.-butylperoxypivalate. Examples of inorganic include for example ammonium-alkali- or earth alkali salts of persulfates, permanganic or manganic acids. A persulfate initiator, e.g. ammonium persulfate (APS), can be used on its own or may be used in combination with a reducing agent. Suitable reducing agents include bisulfites such as for example ammonium bisulfate or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate (Rongalit™) or fluoroalkyl sulfinates. The reducing agent typically reduces the half-life time of the persulfate initiator. Additionally, a metal salt catalyst such as for example copper, iron or silver salts may be added. The amount of initiator may be between 0.01% by weight (based on the fluoropolymer solids to be produced) and 1% by weight. In one embodiment, the amount of initiator is between 0.05 and 0.5% by weight. In another embodiment, the amount may be between 0.05 and 0.3% by weight.

The aqueous emulsion polymerization system may further comprise other materials, such as buffers and, if desired, complex-formers or chain-transfer agents. Examples of chain transfer agents that can be used include dimethyl ether, methyl t-butyl ether, alkanes having 1 to 5 carbon atoms such as ethane, propane and n-pentane, halogenated hydrocarbons such as $CCl_4$, $CHCl_3$ and $CH_2Cl_2$ and hydrofluorocarbon compounds such as $CH_2F$—$CF_3$ (R134a). Additionally esters like ethylacetate, malonic esters are applicable. Other exemplary chain transfer agents include those having the formula $R_fZ_x$ wherein $R_f$ is a substituted or unsubstituted $C_1C_{12}$ fluoroalkyl radical, which may be perfluorinated, Z is Br or I, and x is 1 or 2. Specific examples involving bromide include: $CF_2Br_2$, $Br(CF_2)_2Br$, $Br(CF_2)_4Br$, $CF_2(Cl)Br$, $CF_3CF(Br)CF_2Br$, and the like.

The aqueous emulsion polymerization system may further comprise inorganic additives. For example, metal chloride salts or ammonium chloride salts can be added to the polymerization system to protect or cap the end groups in order to reduce polar end groups during initiation of the polymerization process. Other exemplary inorganic additives include nitrile groups containing salt or nitrile groups containing pseudo halogens, where the salt is selected from an ammonium salt, alkali metal salt, alkaline earth metal salt and tetraalkylammonium salt of cyanate, thiocyanate, or cyanide.

The fluorinated elastomer composition preferably contains the aqueous medium, the fluoroelastomer dispersed in the aqueous medium in an amount of from 10 to 50 mass %, and the fluorinated emulsifier represented by the formula (I) in an amount of from 0.03 to 10 mass % on the basis of the fluoropolymer. Further, it more preferably contains the aqueous medium, the fluoroelastomer dispersed in the aqueous medium in an amount of 15 to 50 mass % and the fluorinated emulsifier represented by the formula (I) in an amount of from 0.05 to 5 mass % on the basis of the fluoropolymer. Still further, it most preferably contains the aqueous medium, the fluoroelastomer dispersed in the aqueous medium in an amount of from 15 to 50 mass %, and the fluorinated emulsifier represented by the formula (I) in an amount of from 0.05 to 5 mass % on the basis of the fluoropolymer.

To the fluorinated elastomer dispersion (latex) produced by the emulsion polymerization method, a coagulant may be added to coagulate the fluorinated elastomer. As the coagulant, any coagulant which is commonly used for coagulation of a fluorinated elastomer dispersion may be used, and it may, for example, be a water soluble salt such as calcium chloride, magnesium chloride, aluminum chloride or aluminum nitrate or aluminum sulfate, an acid such as nitric acid, hydrochloric acid or sulfuric acid, or a water soluble organic liquid such as an alcohol or acetone. The amount of the coagulant to be added is preferably from 0.001 to 20 parts by mass, particularly preferably from 0.01 to 10 parts by mass per 100 parts by mass of the fluorinated elastomer dispersion. Further, the fluorinated elastomer dispersion may be frozen for coagulation or via high shear or ultra sound.

The coagulated fluoroelastomer is preferably collected by filtration and washed with washing water. The washing water may, for example, be ion exchanged water, pure water or ultrapure water. The amount of the washing water may be from 1 to 5 times by mass to the fluorinated elastomer, whereby the amount of the emulsifier attached to the fluorinated elastomer can be sufficiently reduced by one washing. The number of washing is preferably as small as possible in view of operation efficiency, and it is more preferably from one to three times.

The content of the presently disclosed fluorinated emulsifier represented by the formula (I) remaining in the resulting fluoroelastomer is very low. In some embodiments, the content of the fluorinated emulsifier represented by the formula (I) remaining in the resulting fluoroelastomer is less than 100 ppm, in some embodiments less than 50 ppm, especially less than 25 ppm and in some embodiments even less than 5 ppm. These values are based on the solid raw. Within this range, the fluorinated emulsifier will hardly diffuse by vaporization in the crosslinking formation step, resulting in less negative impact on the environment.

The fluorinated emulsifier contained in a waste stream obtained by the coagulation of the presently disclosed fluoroelastomer dispersion may be recovered and recycled by any known recovery method. Exemplary recovery methods include a method of absorbing the fluorinated emulsifier in a strongly basic anion exchange resin or a weakly basic anion exchange resin, a method of adsorbing the fluorinated emulsifier in a synthetic adsorbent, a method of adsorbing the fluorinated emulsifier in activated carbon, a method of including the fluorinated emulsifier in a layered double hydroxide, or a method of concentrating the waste liquid. The fluorinated emulsifier, recovered by the above method, may be recycled by a known method.

The presently disclosed fluoroelastomer may undergo a crosslinking reaction by a known method. Specific examples of the crosslinking reaction include peroxide crosslinking, polyol crosslinking, amine crosslinking and triazine crosslinking. While peroxide crosslinking can be employed in view of productivity of a composition, heat resistance and chemical resistance, other crosslinking methods are also useful.

An organic peroxide in the peroxide crosslinking is a crosslinker and is preferably one which generates peroxide radicals e.g. by heating. Specifically, it may, for example, be a dialkyl peroxide such as di-tert-butyl peroxide, tert-butyl cumyl peroxide, dicumyl peroxide, -bis(tert-butylperoxy)-p-diisopropylbenzene, 1,3-bis(tert-butylperoxyisopropyl)benzene, 2,5-dimethyl-2,5-di-(tert-butylperoxy)hexane or 2,5-dimethyl-2,5-di-(tert-butylperoxy)hexane-3, 1,1-bis(tert-butylperoxy)-3,3,5-trimethylcyclohexane, 2,5-dimethylhexane-2,5-dihydroxyperoxide, benzoyl peroxide, tert-butylperoxybenzene, 2,5-dimethyl-2,5-di-(benzoylperoxy)hexane, tert-butyl peroxymaleic acid or tert-butylperoxyisopropyl carbonate. A dialkyl peroxide is particularly preferred. In general, the type of the organic peroxide to be used and its content in the fluoroelastomer composition are selected depending upon the activity of the organic peroxide, the decomposition temperature, etc.

In some embodiments, the content of the organic peroxide is from 0.3 to 10 parts by mass per 100 parts by mass of the fluoroelastomer. In some embodiments, organic peroxide content is from 0.3 to 5 parts by mass, and in some embodiments, from 0.5 to 3 parts by mass. Physical properties of vulcanizate with strength and elongation being well balanced will be obtained within this range.

Exemplary crosslinking coagents include triallyl cyanurate, triallyl isocyanurate, a triallyl isocyanurate oligomer, trimethallyl isocyanurate, triacrylformal, triallyl trimellitate, N,N'-m-phenylenebismaleimide, p-quinonedioxime, p,p'-benzoylquinone dioxime, dipropargyl terephthalate, diallyl phthalate, N,N',N'',N'''-tetraallyl terephthalamide, or a vinyl group-containing cyloxane oligomer such as polymethylvinylsiloxane or polymethylphenylvinylsiloxane.

In some embodiments, the content of the crosslinking coagent is from 0.1 to 10 parts by mass. In some embodiments the content of crosslinking agent is from 0.5 to 5 parts by mass per 100 parts by mass of the fluorinated elastomer. Physical properties of vulcanizate with strength and elongation being well balanced will be obtained within this range.

In some embodiments, a cure site monomer is involved in curing the presently disclosed fluoroelastomers. The cure site monomer can be partially or fully fluorinated. At least one cure site monomer of at least one fluoropolymer comprises a nitrogen-containing group. Examples of nitrogen-containing groups useful in the cure site monomers include nitrile, imidate, and amidine groups. Some preferred cure site monomers include nitrile-containing cure site monomers. These include nitrile-containing fluorinated olefins and nitrile-containing fluorinated vinyl ethers, such as: $CF_2=CFO(CF_2)_L CN$; $CF_2=CF[OCF_2CF(CF_3)]_rO(CF_2)_xCN$; and $CF_2=CFO(CF_2)_uOCF(CF_3)CN$, wherein L=2-12; q=0-4; r=1-2; y=0-6; t=1-4; and u=2-6. Representative examples of such monomers include $CF_2=CFO(CF_2)_3OCF(CF_3)CN$, perfluoro(8-cyano-5-methyl-3,6-dioxa-1-octene), and $CF_2=CFO(CF_2)_5CN$.

More particularly the presently disclosed fluoroelastomer may be obtained by a process comprising:

(a) polymerizing a fluoromonomer and a cure site monomer in an aqueous emulsion polymerization process to form an aqueous composition comprising a fluoroelastomer;

(b) coagulating the aqueous composition with a metal salt to form a coagulated fluoropolymer;

(c) drying the coagulated fluoropolymer;

wherein the polymerization process is carried out with the aid of a fluorinated emulsifier represented by formula (I) described above, ad wherein the fluoroelastomer is essentially free of cations other than $NH_4^+$ and H.

The process may further comprise (d) curing the coagulated fluoropolymer.

When the presently disclosed fluoroelastomer is crosslinked, a pigment for coloring, a filler, a reinforcing agent or the like may be blended. Exemplary fillers or reinforcing agents include carbon black, titanium oxide, silicon dioxide, clay, talc, or a fluororesin such as polytetrafluoroethylene, polyvinylidene fluoride, polyvinyl fluoride, polychlorotrifluoroethylene, a tetrafluoroethylene/ethylene copolymer or a tetrafluoroethylene/vinylidene fluoride copolymer.

The presently disclosed fluoroelastomer or fluoroelastomer compositions can be used to form articles. By the term "article" is meant a final article such as, for example, an O-ring as well as preforms from which a final shape is made, e.g. a tube from which a ring is cut. To form an article, the fluoroelastomer or the fluoroelastomer composition can be extruded using a screw type extruder or a piston extruder. Alternatively, the fluoroelastomer or fluoroelastomer composition can be shaped into an article using injection molding, transfer molding or compression molding. Compression molding consists of placing a quantity of cold uncured elastomer mixture into a heated mold cavity and subsequently closing the mold using adequate pressure to shape the article. After retaining the rubber at sufficient temperature during sufficient time to allow vulcanization to proceed it can then be demolded. Injection molding is a shaping technique whereby the elastomer mixture is first heated and masticated in an extruder screw then collected in a heated chamber from which it is then injected into a hollow mold cavity by means of a hydraulic piston. After vulcanization the article can then be demolded. Transfer molding is similar to injection molding with the difference being that the elastomer mixture is not preheated and masticated by an extruder screw but introduced as a cold mass in the heated injection chamber. In some embodiments, molding is carried out simultaneously with crosslinking. In some embodiments, molding is carried out before or after crosslinking.

The crosslinking reaction is carried out preferably at from 150° C. to 300° C. When the crosslinking is carried out at a temperature within this range, the resulting article has excellent physical properties. The crosslinking reaction is carried out usually combining a primary crosslinking (press curing) reaction at a relatively low temperature and a secondary crosslinking (post curing) reaction at a relatively high temperature. The temperature for the primary crosslinking reaction is usually preferably from 150° C. to 190° C. The temperature for the secondary crosslinking reaction is usually preferably from 170° C. to 300° C.

Articles derived from the finished fluoroelastomers presently disclosed are useful for in the semiconductor industry for the microchip manufacturing process where the fluoroelastomer may be used in seats of microchip fabrication equipment. The presently disclosed finished fluoroelastomers are also useful in any articles where low metal content is desirable, for example O-rings, quick connect seals, gaskets and the like in the pharmaceutical industry.

The fluorinated emulsifiers presently disclosed eliminate more quickly from a living organism, as demonstrated on rat screening studies, than perfluoro alkanoic acids having 8 or more carbon atoms. Additionally, it has been found that the disclosed fluorinated emulsifiers can be used in the emulsion polymerization of fluorinated monomers to produce fluoropolymer dispersions and can be recovered there from in an easy and convenient way. Because of their lower bio-accumulation, the presently disclosed fluorinated should provide less of an environmental burden in case of small losses of these compounds. Also, the process of reducing the amount of these fluorinated emulsifiers in the dispersion should be more beneficial for operators of the process that may be exposed, for example accidentally, to these emulsifiers used in work-up procedures following the recovery from the dispersion. In addition, articles derived the finished fluoroelastomers presently disclosed have less environmental issues than fluoroelastomers created with emulsifiers containing alkanoic acids having 8 or more carbon atoms and lower metal content than articles derived from fluoroelastomers created with other alternative emulsifiers.

Example 1

Test Methods

Thermal decomposition analysis was conducted at 550° C. via ICP-OES.

The metal content of the fluorinated emulsifiers used in the examples was as follows:

|  | APFO | $CF_3-O-(CF_2)_3-O-CFH-CF_2-COONH_4$ | Detection Limit |
|---|---|---|---|
| µg/g Fe | <1 | <1 | 1 ppm |
| µg/g Ni | <1 | <1 | 1 ppm |
| µg/g Cr | <1 | <1 | 1 ppm |
| µg/g Cu | <1 | 2 | 1 ppm |

-continued

| | APFO | CF$_3$—O—(CF$_2$)$_3$—O—CFH—CF$_2$—COONH$_4$ | Detection Limit |
|---|---|---|---|
| µg/g Zn | <1 | <1 | 1 ppm |
| µg/g Mn | <1 | <1 | 1 ppm |
| µg/g Co | <1 | <1 | 1 ppm |
| µg/g Al | <1 | <1 | 1 ppm |
| µg/g Na | <5 | <5 | 5 ppm |
| µg/g K | <5 | <5 | 5 ppm |
| µg/g Ca | <1 | <1 | 1 ppm |
| µg/g Mg | <1 | <1 | 1 ppm |
| µg/g Ba | <1 | <1 | 1 ppm |
| µg/g Li | <1 | <1 | 1 ppm |
| µg/g total metal | 22 | 23 | |

Comparative Example 1

Under oxygen-free condition a 4 Liter kettle was charged with 2900 mL deionized water. 26 grams C$_2$F$_{15}$COONH$_4$ (APFO), 8 grams C$_4$F$_9$SO$_2$NH$_4$ and 2.8 grams NH$_4$Cl were added. After heating to 65° C., 133 grams tetrafluoroethene (TFE) and 265 grams perfluoromethylvinyl ether (PMVE) were added and 5 grams CF$_2$=CFO(CF$_2$)5CN (MV5CN) were added as preemulsion. The reaction was initiated with addition of 6 grams ammonium peroxodisulphate (APS) dissolved in 50 mL deionized water. At 14 bar pressure and 65° C., 641 grams TFE, 547 grams PMVE, and 48 grams MV5CN (as preemulsion) were fed over a period of 287 minutes. The resulting dispersion had a solid content of 34% and was coagulated with 9.4 grams MgCl$_2$. The polymer was dried at 115° C.

The composition of the resulted polymer was 1.14 mole % MV5CN, 34 mole % PMVE, 64.86 mole % TFE. The endgroup ratio was 0.063 (according to the method described in U.S. Pat. No. 6,114,452) and Mooney-Viscosity (1+10', 121° C.) was 94.

Example 1

Under oxygen-free condition a 4 Liter kettle was charged with 2900 mL deionized water. 20 grams CF$_3$—O—(CF$_2$)$_3$—O—CFH—CF$_2$—COONH$_4$ 7 grams C$_4$F$_9$SO$_2$NH$_4$ and 2.8 grams NH$_4$Cl were added. After heating to 65° C., 150 grams tetrafluoroethene (TFE) and 298 grams perfluoromethylvinyl ether (PMVE) were added and 5 grams MV5CN were added. The reaction was initiated with addition of 5 grams ammonium peroxodisulphate (APS) dissolved in 50 mL deionized water. At 14 bar pressure and 65° C., 661 grams TFE, 567 grams PMVE, and 48 grams MV5CN (as preemulsion) were fed over a period of 362 minutes. The resulting dispersion had a solid content of 29% and was coagulated with 9.4 g MgCl$_2$. The polymer was dried at 115° C. The composition of the resulted polymer was 1.24 mole % MV5CN, 35 mole % PMVE, 63.76 mole % TFE. The endgroup ratio was 0.084 (according to the method described in U.S. Pat. No. 6,114,452) and Mooney-Viscosity (1+10', 121° C.) was 72.

Comparative Example 2

Under oxygen-free condition a 450 Liter kettle was charged with 369 L deionized water. 3.5 kg C$_7$F$_{15}$COONH$_4$ (APFO) and 517 grams C$_4$F$_9$SO$_2$NH$_4$ were added. After heating to 72° C., 4.4 kg tetrafluoroethene (TFE), 15 kg perfluoromethylvinyl ether (PMVE) and 130 grams brom-trifluoroethene (BTFE) were added. The reaction was initiated with addition of 778 grams ammonium peroxodisulphate (APS). Thereafter 125 grams NH$_3$ was added. At 14 bar pressure and 72° C., 105 kg TFE, 102 grams PMVE, and 1.6 kg BTFE were fed over a period of 312 minutes. The resulting dispersion had a solid content of 36% and was coagulated with 1349 grams MgCl$_2$. The polymer was dried at 115° C. The composition of the resulted polymer was 0.6 mole % BTFE, 36 mole % PMVE, 63.4 mole % TFE. The endgroup ratio was 0.056 (according to the method described in U.S. Pat. No. 6,114,452) and Mooney-Viscosity (1+10', 121° C.) was 88.

Example 2

Under oxygen-free condition a 40 Liter kettle was charged with 26 L deionized water. 180 grams CF$_3$—O—(CF$_2$)$_3$—O—CFH—CF$_2$—COONH$_4$ and 46 grams C$_4$F$_9$SO$_2$NH$_4$ were added. After heating to 72° C., 602 grams tetrafluoroethene (TFE), 2 kg perfluoromethylvinyl ether (PMVE) and 15 grams brom-trifluoroethene (BTFE) were added. The reaction was initiated with addition of 70 grams ammonium peroxodisulphate (APS). Thereafter 6 grams NH$_3$ were added. At 14 bar pressure and 72° C., 7 kg TFE, 6.4 kg PMVE, and 110 grams BTFE were fed over a period of 270 minutes. The resulting dispersion had a solid content of 35% and was coagulated with 93.7 grams MgCl$_2$. The polymer was dried at 115° C. The composition of the resulted polymer was 0.65 mole % BTFE, 34.7 mole % PMVE, 64.65 mole % TFE. The endgroup ratio was 0.063 (according to the method described in U.S. Pat. No. 6,114,452) and Mooney-Viscosity (1+10', 121° C.) was 87.

TABLE 1

| | | Comparative Example 2 | Example 2 | Comparative Example 1 | Example 1 | Detection Limit |
|---|---|---|---|---|---|---|
| Metal content (of solid material) | µg/g Fe | 1.2 | <1 | 1.5 | 1 | 1 ppm |
| | µg/g Ni | 1.2 | <1 | 1.5 | <1 | 1 ppm |
| | µg/g Cr | 1.2 | <1 | 1.5 | <1 | 1 ppm |
| | µg/g Cu | 1.2 | <1 | 1.5 | <1 | 1 ppm |
| | µg/g Zn | 1.2 | <1 | 1.5 | <1 | 1 ppm |
| | µg/g Mn | 1.2 | <1 | 1.5 | <1 | 1 ppm |

TABLE 1-continued

|  | Comparative Example 2 | Example 2 | Comparative Example 1 | Example 1 | Detection Limit |
|---|---|---|---|---|---|
| μg/g Co | 1.2 | <1 | 1.5 | <1 | 1 ppm |
| μg/g Al | 1.2 | 1 | 1.5 | 1 | 1 ppm |
| μg/g Na | 6.2 | <5 | 7.3 | <5 | 5 ppm |
| μg/g K | 6.2 | <5 | 7.3 | <5 | 5 ppm |
| μg/g Ca | 1.2 | 1 | 5.9 | 5 | 1 ppm |
| μg/g Mg | 173.3 | 129 | 155.4 | 104 | 1 ppm |
| μg/g Ba | 1.2 | <1 | 1.5 | <1 | 1 ppm |
| μg/g Li | 1.2 | <1 | 1.5 | <1 | 1 ppm |
| μg/g total metal | 199.2 | <150 | 190.6 | <129 |  |

Used Method: Thermal Decomposition at 550° C. and analysis via ICP-OES (related to Standard: EN ISO 11885E22)

TABLE 2

|  | Comparative Example 2 | Example 2 | Comparative Example 1 | Example 1 | Detection Limit |
|---|---|---|---|---|---|
| Residual Emulsifier Content μg/g | 0.1 | 0.1 | 0.7 | 0.2 | 0.02 |

Comparative Example 3

Under oxygen-free condition a 1200 Liter kettle was charged with 720 kg deionized water. 1.6 kg $CF_3-(CF_2)_6-COONH_4$ (APFO), 170 g $HO-CH_2SO_2Na \times 2H_2O$ and 770.4 g $CH_3-O-C(CH_3)_3$ were added. After heating to 30 C 10.4 kg tetrafluoroethene (TFE), 19.1 kg 1,1-difluoroethene (VDF), 130 g bromotrifluoroethene (BTFE) were added and 50 kg perfluoro-3,7-dioxa-1-octene (MV31) was added (described in WO 2002060968A1). The reaction was initiated with addition of 25 g $(CH_3)_3-O-OH$ (t-BHP) dissolved in 3.5 L deionized water. At 9.5 bar pressure and 30° C. 58 kg TFE, 116 kg VDF, 1.4 kg BTFE, 210 kg MV31 (as preemulsion) and 61 g t-BHP (as 0.7 wt % solution in deionized water) were fed over a period of 217 min. The resulting dispersion had a solid content of 31% and was coagulated with $MgCl_2$. The polymer was dried at 80 C.

The composition of the resulted polymer was 59 mole % VDF, 21 mole % MV31, 19 mole % TFE, and 0.21 mole % BTFE. Tg was −41° C. (using differential scanning calorimetry, DSC) and Mooney-Viscosity (1+10', 121° C.) was 97.

Example 3

Under oxygen-free condition a 150 Liter kettle was charged with 84.5 kg deionized water. 264 g $CF_3-O-(CF2)_3-O-CFH-CF_2-COONH_4$, 20 g $HO-CH_2SO_2Na \times 2H_2O$ and 90.4 g $CH_3-O-C(CH_3)_3$ were added. After heating to 30° C. 1300 g tetrafluoroethene (TFE), 2350 g 1,1-difluoroethene (VDF), 15 g bromotrifluoroethene (BTFE) were added and 4000 g perfluoro-3,7-dioxa-1-octene (MV31) was added (described in WO 2002060968A1). The reaction was initiated with addition of 5 g $(CH_3)_3C-O-OH$ (t-BHP) dissolved in 500 mL deionized water. At 9.5 bar pressure and 30° C. 7.2 kg TFE, 14.1 kg VDF, 158 g BTFE, 25.5 kg MV31 (as preemulsion) and 5 g t-BHP (as 0.5 wt % solution in deionized water) were fed over a period of 210 min. The resulting dispersion had a solid content of 32% and was coagulated with $MgCl_2$. The polymer was dried at 80° C.

The composition of the resulted polymer was 61 mole % VDF, 21 mole % MV31, 18 mole % TFE, and 0.2 mole % BTFE. Tg was −42° C. (using DSC) and Mooney-Viscosity (1+10', 121° C.) was 104.

|  |  | Comparative Example 3 | Example 3 | Detection Limit |
|---|---|---|---|---|
| Metal content (of solid material) | μg/g Fe | 1.8 | <1 | 1 ppm |
|  | μg/g Ni | 1.8 | <1 | 1 ppm |
|  | μg/g Cr | 1.8 | <1 | 1 ppm |
|  | μg/g Cu | 1.8 | <1 | 1 ppm |
|  | μg/g Zn | 1.8 | <1 | 1 ppm |
|  | μg/g Mn | 1.8 | <1 | 1 ppm |
|  | μg/g Co | 1.8 | <1 | 1 ppm |
|  | μg/g Al | 1.8 | 1 | 1 ppm |
|  | μg/g Na | 8.8 | <5 | 5 ppm |
|  | μg/g K | 8.8 | <5 | 5 ppm |
|  | μg/g Ca | 1.8 | 8 | 1 ppm |
|  | μg/g Mg | 58.0 | 17 | 1 ppm |
|  | μg/g Ba | 1.8 | <1 | 1 ppm |
|  | μg/g Li | 1.8 | <1 | 1 ppm |
|  | μg/g total metal | 95.0 | 45.0 |  |

What is claimed is:

1. An article prepared from a fluoroelastomer, the fluoroelastomer being derived from an emulsion, the emulsion comprising a fluorinated emulsifier represented by the formula:

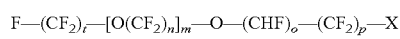

$F-(CF_2)_t-[O(CF_2)_n]_m-O-(CHF)_o-(CF_2)_p-X$ wherein m=1 to 3; n=1 to 3; o=1; p=1; t=1 to 10; and further wherein X is selected from a group consisting of a carboxyl acid group and a salt of a carboxylic acid group, and wherein the fluoroelastomer is essentially free of cations other than $NH_4^+$ and $H^+$.

* * * * *